April 13, 1937.   A. F. LIFVENDAHL ET AL   2,077,337
SEAT CONSTRUCTION
Filed Feb. 8, 1935

Inventors
Axel F. Lifvendahl &
Carl J. Johnson

Patented Apr. 13, 1937

2,077,337

UNITED STATES PATENT OFFICE 2,077,337

SEAT CONSTRUCTION

Axel F. Lifvendahl and Carl J. Johnson, Chicago, Ill.

Application February 8, 1935, Serial No. 5,530

8 Claims. (Cl. 155—81)

Our invention relates to a seat construction of the variety generally termed as a bracket seat and has particular reference to a seat which is adapted for use in a variety of places, including elevator cars, cabs, an auxiliary seat for automobiles, counters, and the like, and has particular reference to a seat adapted to be secured to the vertical wall extending parallel to the direction in which the person using the seat is to be seated, such as passenger car elevators and the like.

The primary object of our invention is the provision of a seat which can be secured to the side wall of a passenger car in such position that the arm on which the seat is mounted is freely movable in a horizontal position on its mounting so that the operator, when using the seat, is in substantially the same position as if he were standing, in that his position can be easily shifted to accommodate various operating conditions, such as a crowded condition of the passenger elevator car in which case the operator can shift his position forward from that in which he normally would occupy, thereby making room for at least an additional passenger in the car and also enabling him to operate the controls with greater facility than he would otherwise do.

Another and further object of our invention is the provision of a seat which, when not in use, can readily and quickly be folded and placed against the wall so that it takes up no space in the car and can be turned completely out of the way of the operator or passengers in the car and be equally ready and accessible for use when desired.

Another and further object of our invention is the provision of an elevator seat in which the seat portion thereof is so mounted upon the support or arm that when normally in a horizontal position, it tilts forward conforming to the position of the operator's body, making the seat more comfortable in operation and at the same time remaining in proper position without danger of turning and throwing the operator out of the seat.

Still another and further object of our invention is the provision of a seat which is capable of a plurality of adjustments, both with respect to the vertical adjustment to accommodate the seat to the proper height to be comfortable to the user and also provision is made for the movement of the seat portion on the arm to or away from the supporting wall on which the seat is mounted with an adequate length of supporting arm, so that the seat is positioned far enough from the supporting wall to allow for comfort and freedom of movement of the user.

Another and further object of our invention is the provision of a mounting on the arm supporting it so that, when the seat is turned to inoperative position, it assumes a position on the arm so that the seat portion clears the forward wall, particularly of a passenger car elevator, automatically without any attention on the part of the operator and also provides means for easy adjustment of the seat to and away from the supporting wall to allow for adequate freedom of the operator.

These and other objects of our invention will be more fully described and better understood with reference to the accompanying sheet of drawings in which—

Figure 1 is a rear view partially in elevation and partially in section of our improved seat on the lines 1—1 of Figure 2;

Figure 2 is a top plan view of the seat shown in Figure 1;

Figure 3 is a fragmentary view showing the seat attached to the side wall of an elevator car;

Figure 4 is a sectional view of the bracket supporting the seat proper on lines 4—4 of Figure 2;

Figure 5 is a cross sectional view through the supporting arm and bracket on lines 5—5 of Figure 2; and Figure 6 is a detail plan sectional view of the seat supporting bracket on line 6—6 of Figure 4.

Referring now particularly in detail to the figures of the drawing and in which like reference characters indicate like parts throughout, a side wall 10 of a passenger elevator car or the like is shown with a front wall 11 of an elevator car and a floor 12. Secured to the side wall 10 is a supporting bracket comprising a base portion 13 which is adapted to fit against and be secured to the car wall 10 in any approved manner and a cylindrical portion 14. Mounted in the cylindrical portion 14 in threaded engagement with the outer wall and extending therethrough is an adjusting screw 15, having an enlarged outer head 16 for hand-operation of the screw. Mounted in the cylindrical portion of the bracket 14 is a sleeve 17 having a tapered bore 18 therein and within which an arm 19 is mounted, the end of the arm 19 being tapered to correspond to the tapered bore 18 in the sleeve 17. The sleeve 17 has a plurality of recesses 20, 20 therein adapted to receive the end of the adjusting screw 15 to secure proper vertical adjustment of the seat. The sleeve 17 is shorter in length than the cylindrical portion 14 of the bracket, thereby leaving a recess in the lower end of the cylindrical portion of the bracket 14 within which the lower threaded end 21 of the arm 19 extends. A spring 22 is mounted on the lower end, with washers 23 being provided and a nut 24 being in threaded engagement with the lower end of the arm 19 being provided which, when drawn taut, compresses the spring 22 thereby holding the tapered end of the arm 19 in close engagement in the sleeve thereby preventing loose swinging movement of the arm 19. Means are thus provided for taking up the wear between the arm 19 and the sleeve 17 while allowing the shaft to rotate freely in the sleeve 17 to secure proper horizontal positioning of the seat and at the same time is held tightly enough in the sleeve 17 to retain the seat in a predetermined position and prevent free-swinging in a horizontal position of the arm 19.

Mounted on the opposite end of the arm 19 is a seat 25 which is secured to the arm 19 by means of a seat-bracket comprising a base portion 26 adapted to seat against the underside of the seat portion and secured thereto by any appropriate means, as by screws 27, 27, which pass through screw holes 27a, 27a in the base portion 26 of the seat-bracket. The seat-bracket has a cylindrical portion 28 which fits over the free end of the arm 19 and has a circumferentially extending channel 29 formed therein which extends somewhat over half the distance circumferentially of the portion 28 of the bracket and terminates in a recess formed in the cylindrical portion of the seat-bracket. The side walls 30, 30 adjacent the recesses are inclined at one side and the opposite walls are substantially parallel to the axis of the shaft 19 and have a plurality of recesses 31, 31 therein to provide for the adjusted position of the seat 25 and within which a pin 32 is seated, the pin 32 being seated in an opening in the arm 19 with a smaller opening 33 in axial alignment therewith to provide means by which the pin 32 may be driven out of the arm 19 to provide for right and left hand mounting of the seat as will be hereinafter described.

From the underside of the arm 19 is provided a plurality of drilled openings 34, 34 within which springs 35, 35 are mounted with balls 36, 36 being mounted in these openings which are normally pushed outward by the springs 35 and adapted to take up wear or looseness of the seat on the arm 19 and provide frictional means whereby the seat is normally secured against easy rotation about the shaft 19, but frictionally held in such position that the seat may be rotated about the shaft 19, if desired. The seat-bracket normally is secured in front of the center of the seat 25 (Figure 2) thereby insuring that the seat 25 will not, of its own weight, revolve about the arm 19 and insuring further that, when the seat is placed in this position, it will remain in a horizontal position until intentionally changed by the operator.

In operation of the device it will be understood that the seat is mounted as shown in Figure 1 and when it is desired to mount it for operation in the position for use, as shown in Figure 1, and when in this position the operator desires to move the seat 25 in axial alignment with the upper portion of the arm 19, the seat is tilted forward a slight distance to the proper position, whereby one of the recesses 31 is in alignment with the pin 32 and the rear end of the seat thereby lowered to horizontal position so that the pin engages in the appropriate notch 31 in the seat-bracket. The operator also secures the proper vertical adjustment of the seat by loosening the screw 15 and raising or lowering the seat until one of the recesses 20 is in proper alignment with the screw 15, whereby the operator turns the screw 15 up into tight position thereby securing the proper vertical adjustment of the seat. When it is desired to fold the seat, the operator, by lifting the rear edge of the seat, rotates it about the horizontal portion of the arm 19 and if the seat is in such position that the pin is within one of the side recesses as he rotates it, the pin 31 engages against the side walls 30, 30 in the cylindrical portion 28 of the seat-bracket thereby causing the seat and seat-bracket to travel in axial alignment with the horizontal portion of the arm 19 until the circumferential channel 32 is reached, whereupon the operator continues to turn the seat around the horizontal portion of the shaft 19 until the seat is turned through an arc approximating three-fourths that of a circle until the rear or heavy portion of the seat is in a downward position and the bracket pushed up against the wall, particularly as shown in Figure 3 in dotted lines. In this position the seat is out of the way of the operator and if the wall bracket is mounted sufficiently close to the end wall to prevent the seat being placed in folded position when the seat portion is in the outermost recess 31, the seat 25 is caused to travel inward in such position that it clears the elevator car and can be folded up into position with the seat facing outward from the side wall of the car. Likewise when the operator desires to place the seat into position, he swings the arm 19 outward to an approximate 45° angle with the side wall and turns the seat in a clockwise direction approximately three-fourths of a circle until the seat portion is in a horizontal position when it can be manually adjusted along the horizontal portion of the arm 19 to such position as may be desired by the operator, with the recesses 31 engaging in the pin 32. In this position the seat is ready for use and as the operator is seated upon it, he can move the seat while sitting on it towards or away from the forward wall, as he may desire, by placing his feet against the forward wall of the car or upon the floor in order to secure a comfortable and proper position for the control of the car.

If the seat is mounted in a passenger elevator car and it becomes crowded, the operator can move his position forward until he is quite close to the controls by placing his feet upon the floor and pushing the seat, while sitting on it, forward toward the front wall of the car and yet remain in a seated position out of the way of the passengers and in this way approximate the same position as he would occupy when standing.

The devise is adapted for either right or left hand use, that is, applied to either the right or left hand side of a door opening and when desired to position the seat upon the arm 19, it is only necessary to turn the seat into a vertical position, insert a punch through the opening 33 and drive the pin 32 out of the arm 19, whereupon the seat can be slipped over the end of the shaft, its position reversed, placed back into position and the pin 32 reinserted in the opening provided to receive it in the end of the arm 19.

While we have described more or less precisely the details of construction, we do not wish to be understood as limiting ourselves thereto, as we contemplate changes in form and the proportion of parts and the substitution of equivalents as circumstances may suggest or render expedient without departing from the spirit or scope of our invention.

We claim:

1. A seat comprising in combination a supporting bracket, a sleeve having a tapered bore mounted in said bracket, means for preventing rotation of said sleeve, an arm having a tapered end rotatably mounted in said sleeve, a spring on said arm in abutting engagement with the lower end of said sleeve, spring retaining means on the end of said arm, whereby said tapered end of the arm is held frictionally in said sleeve, and a seat member rotatably mounted on said arm.

2. A seat comprising in combination a supporting bracket, a sleeve having a tapered central bore and a plurality of recesses in spaced vertical relation on its outer side mounted on said bracket, an adjusting screw carried by said bracket adapted to engage in the recesses in said sleeve, an arm having a tapered end rotatably mounted in said sleeve, means for yieldingly drawing the tapered end down into said sleeve to cause frictional engagement between said arm and sleeve, and a seat member rotatably mounted on said arm.

3. A seat comprising in combination a supporting bracket, a sleeve having a tapered central bore and having a plurality of recesses in spaced vertical relation on its outer side mounted on said bracket, an adjusting screw, said screw adapted to engage in the recesses in said sleeve, an arm having a tapered end rotatably mounted in said sleeve, take-up means mounted on the lower end of the said arm to draw the tapered end down into frictional engagement with said sleeve, and a seat member rotatably mounted on said arm.

4. A seat comprising in combination, a supporting bracket, a sleeve mounted therein, an arm rotatably mounted in said sleeve, a spring on the end of said arm in abutting engagement with the said sleeve, spring retaining means on the end of said arm, a seat-bracket having a recessed channel extending partially therearound, means on said arm operating in said channel to engage a recess in said seat-bracket adapted to hold the seat in predetermined position and a seat mounted on said seat-bracket.

5. A seat comprising in combination, a supporting bracket, a sleeve mounted therein, an arm rotatably mounted in said sleeve, a spring mounted on the end of said arm and in abutting engagement with the lower end of the said sleeve, a seat-bracket having a recessed channel extending partially therearound, a pin on said arm operating in said channel to engage in a recess in said seat-bracket adapted to hold the seat-bracket in predetermined position and a seat mounted on said seat-bracket.

6. A seat comprising in combination, a supporting bracket, a sleeve mounted therein, an arm rotatably mounted in said sleeve, a spring mounted on the end of said arm and in abutting engagement with the lower end of the said sleeve, a seat-bracket having a seat engaging portion and a cylindrical portion adapted to receive one end of the said arm, the cylindrical portion having a longitudinal recess therein and a channel extending partially around said cylindrical portion and connected with the longitudinal recess of said bracket, means on said arm operating in said channel to engage said seat-bracket adapted to hold the seat-bracket in predetermined position and a seat mounted on said seat-bracket.

7. A seat comprising in combination, a supporting bracket, a sleeve mounted therein, an arm rotatably mounted in said sleeve, a spring mounted on the end of said arm and in abutting engagement with the lower end of the said sleeve, a seat-bracket having a seat engaging portion and a cylindrical portion adapted to receive one end of the said arm, the cylindrical portion having a longitudinal recess therein and a channel extending partially around said cylindrical portion and connected with the longitudinal recess of said bracket, means on said arm operating in said channel to engage said seat-bracket adapted to hold the seat-bracket in predetermined position, a seat mounted on said seat-bracket and the said longitudinal recess having inclined walls at one side thereof.

8. A seat comprising in combination, a supporting bracket, a sleeve mounted therein, an arm rotatably mounted in said sleeve, a spring mounted on the end of said arm and in abutting engagement with the lower end of the said sleeve, a seat-bracket having a seat engaging portion and a cylindrical portion adapted to receive one end of the said arm, the cylindrical portion having a notched longitudinal recess therein and a channel extending partially around said cylindrical portion and connected with the recessed portion of said bracket, means on said arm operating in said channel to selectively engage one of the notches in the recessed portion of said seat-bracket adapted to hold the seat-bracket in predetermined position and a seat mounted on said seat-bracket, the walls of the recessed portion of said bracket being inclined toward the said channel.

AXEL F. LIFVENDAHL.
CARL J. JOHNSON.